(12) United States Patent
Jang et al.

(10) Patent No.: US 9,355,319 B2
(45) Date of Patent: May 31, 2016

(54) SYSTEM AND METHOD FOR DETECTING ROAD SURFACE CONDITIONS

(71) Applicant: Hyundai Motor Company, Seoul (KR)

(72) Inventors: Yoon Ho Jang, Seoul (KR); Kyoung Moo Min, Yangju-Si (KR); Eun Jin Choi, Suwon-Si (KR); Jin Hak Kim, Suwon-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 24 days.

(21) Appl. No.: 14/018,388

(22) Filed: Sep. 4, 2013

(65) Prior Publication Data

US 2014/0336842 A1 Nov. 13, 2014

(30) Foreign Application Priority Data

May 9, 2013 (KR) .................. 10-2013-0052409

(51) Int. Cl.
*G06K 9/00* (2006.01)

(52) U.S. Cl.
CPC ........ *G06K 9/00791* (2013.01); *G06K 9/00805* (2013.01)

(58) Field of Classification Search
CPC .................... B60G 2400/82; B60G 2400/821; G06K 9/00805; G06K 9/00791; B60W 2550/147
See application file for complete search history.

(56) References Cited

U.S. PATENT DOCUMENTS

| 4,958,306 | A  | * | 9/1990  | Powell et al. ............... 702/40 |
|-----------|----|---|---------|-------------------------------------|
| 5,163,319 | A  |   | 11/1992 | Spies et al.                        |
| 8,306,672 | B2 | * | 11/2012 | Nickolaou .................. 701/1   |
| 2009/0097038 | A1 | * | 4/2009 | Higgins-Luthman et al. ............... 356/602 |
| 2010/0098290 | A1 | * | 4/2010 | Zhang et al. ............ 382/100 |
| 2013/0147957 | A1 | * | 6/2013 | Stein ...................... 348/148 |
| 2013/0148101 | A1 | * | 6/2013 | Yoo et al. ................ 356/5.01 |
| 2014/0122014 | A1 | * | 5/2014 | Flik et al. ................ 702/141 |
| 2014/0160295 | A1 | * | 6/2014 | Kyomitsu et al. ........ 348/159 |

FOREIGN PATENT DOCUMENTS

| JP | 2642977 B2    | 8/1997  |
| JP | 2005-300294 A | 10/2005 |
| JP | 2009-199154 A | 9/2009  |
| JP | 2012-098803 A | 5/2012  |
| KR | 2006-0027928 A | 3/2006 |
| KR | 10-1030211 B1 | 4/2011  |

\* cited by examiner

*Primary Examiner* — John Q Nguyen
*Assistant Examiner* — Michael Whalen
(74) *Attorney, Agent, or Firm* — McDermott Will & Emery LLP

(57) ABSTRACT

A system for identifying road surface conditions includes a road surface measurement sensor attached to a vehicle and configured to generate a measurement signal for a road surface condition, and a controller. The controller is configured to digitalize the measurement signal received from the road surface measurement sensor, calculate a curvature pattern for the road surface condition based on the digitalized measurement signal, and compare the calculated curvature pattern with a pre-stored curvature pattern to identify the road surface condition.

7 Claims, 5 Drawing Sheets

| | CURVATURE PATTERN INFORMATION |
|---|---|
| (a) SPEED BUMP |  |
| (b) SPEED BUMP |  |
| (c) DENTED ROAD SURFACE |  | ed value, and compare

SYSTEM AND METHOD FOR DETECTING ROAD SURFACE CONDITIONS

CROSS-REFERENCES TO RELATED APPLICATIONS

This application is based on and claims priority of Korean patent application No. 10-2013-0052409 filed on May 9, 2013 in the Korean Intellectual Property Office, the entire contents of which are hereby incorporated by reference.

TECHNICAL FIELD

The present inventive concept relates to a system and method for detecting road surface conditions. More particularly, the present inventive concept relates to a system and method for detecting road surface conditions, which compares a curvature pattern extracted from a signal measured in a road surface measurement sensor attached to the front of a vehicle with a pre-stored curvature pattern to identify a road surface condition in a vehicle moving direction, and provides a driver the detected road surface condition.

BACKGROUND

Generally, when vehicles are traveling on a road with a speed bump, in a dented road, in an unpaved road, and the like, bottoms of the vehicles may be scraped or safety accidents may occur. Therefore, the vehicles include suspensions configured to smoothly pass the roads.

The suspensions of the vehicles, connected to axles of the vehicles, control vibrations or shocks received from the road surface during the traveling of the vehicles not to be directly transferred to the vehicles themselves, prevent vehicle bodies or passengers, cargos, and the like from being damaged, and improve ride comfort of the vehicles.

The suspension is configured of a chassis spring configured to cushion shocks from the road surface, a shock absorber configured to control free vibration of the chassis spring to improve ride comfort, a stabilizer bar configured to prevent rolling of the vehicle, and the like.

The shock absorber in the suspension is installed between the vehicle body and wheels, and absorbs natural vibration generated by shock received in a spring during the traveling of the vehicle to increase damping speed of the vibration and to improve the ride comfort.

Electronic control suspension system (ECS) in which the shock absorber and an air spring are mounted is used to control an actuator so that the vibration from the road surface is minimized to promote the improvement in the ride comfort.

However, since the ECS performs suspension and damping control at the point of time when the vehicle passes the speed bump, the damping for the vibration according to the road surface condition is insufficiently done. Further, since the drivers may not frequently recognize road conditions (speed bump, Belgian road, unpaved road, and the like), vibration damping of the vehicle is not easy.

SUMMARY

Accordingly, various aspects of the present inventive concept have been made in view of the above problems, and provide a system and a method for detecting road surface conditions, which detects a road surface condition, and provides a driver an accurate numerical value for a height of a road surface due to a speed bump or a dented road surface, and the type of road surface condition.

An aspect of the present inventive concept relates to a system for detecting road surface conditions. The system may include a road surface measurement sensor attached to a vehicle and configured to generate a measurement signal for a road surface condition, and a controller configured to digitalize the measurement signal received from the road surface measurement sensor, calculate a curvature pattern for the road surface condition based on the digitalized value, and compare the calculated curvature pattern with a pre-stored curvature pattern to calculate the road surface condition.

The controller may be configured to digitalize the received measurement signal, convert the digitalized value into a coordinate value, extract a vector value based on the coordinate value, and calculate a curvature for the road surface condition using the vector value.

The controller may be configured to calculate the curvature pattern for the road surface condition based on the calculated curvature, compare the calculated curvature pattern with the pre-stored curvature pattern to accumulate the number of times for a threshold period of time when the two curvature patterns match each other, and identify the road surface condition when the cumulative number of times is more than a threshold value.

The system may further include a display unit configured to combine the identified road surface condition with image data corresponding to a location of the vehicle, and display a result of the combination.

The system may further include a global positioning system (GPS) configured to identify the location of the vehicle.

The controller may be configured to map the road surface condition, the location of the vehicle identified in the GPS, and the image data, and store a result of the mapping.

Another aspect of the present inventive concept encompasses a method for identifying road surface conditions. According to the method, a measurement signal for a road surface condition corresponding to a location of a vehicle is received from a road surface measurement sensor through a controller. The received measurement signal is digitalized. A curvature pattern for the road surface condition is calculated based on the digitalized value. The calculated curvature pattern is compared with a pre-stored curvature pattern to identify the road surface condition. The identified road surface condition is displayed.

The digitalizing of the received measurement signal may include digitalizing the received measurement signal and converting the digitalized measurement signal into a coordinate value, extracting a vector value based on the coordinate value, and calculating a curvature for the road surface condition using the vector value.

The identifying of the road surface condition may include comparing the calculated curvature pattern with the pre-stored curvature pattern to accumulate the number of times when the two curvature patterns match each other, and identifying the road surface condition when the accumulated number of times is more than a threshold value.

The displaying of the identified road surface condition may include combining the identified road surface condition with image data corresponding to the location of the vehicle, and displaying a result of the combination.

The method may further include identifying the location of the vehicle in which the road surface condition is displayed, mapping the road surface condition, the image data, and the location of the vehicle, and storing a result of the mapping, after the displaying of the identified road surface condition.

According to an aspect of the present inventive concept, the system and method for identifying road surface conditions detect a road surface condition, and provide the driver an accurate numerical value for a height of the road surface due to a speed bump or a dented road surface, and the type of the road surface condition to ensure safety of the vehicle in traveling and to improve ride comfort of a passenger.

The systems and methods of the present inventive concept have other features and advantages which will be apparent from or are set forth in more detail in the accompanying drawings, which are incorporated herein, and the following Detailed Description of the Inventive concept, which together serve to explain certain principles of the present inventive concept.

BRIEF DESCRIPTION OF THE DRAWINGS

The foregoing and other features of the inventive concept will be apparent from a more particular description of embodiments of the inventive concept, as illustrated in the accompanying drawings in which like reference characters may refer to the same or similar parts throughout the different views. The drawings are not necessarily to scale, emphasis instead being placed upon illustrating the principles of the embodiments of the inventive concept.

DETAILED DESCRIPTION

Figure 1:
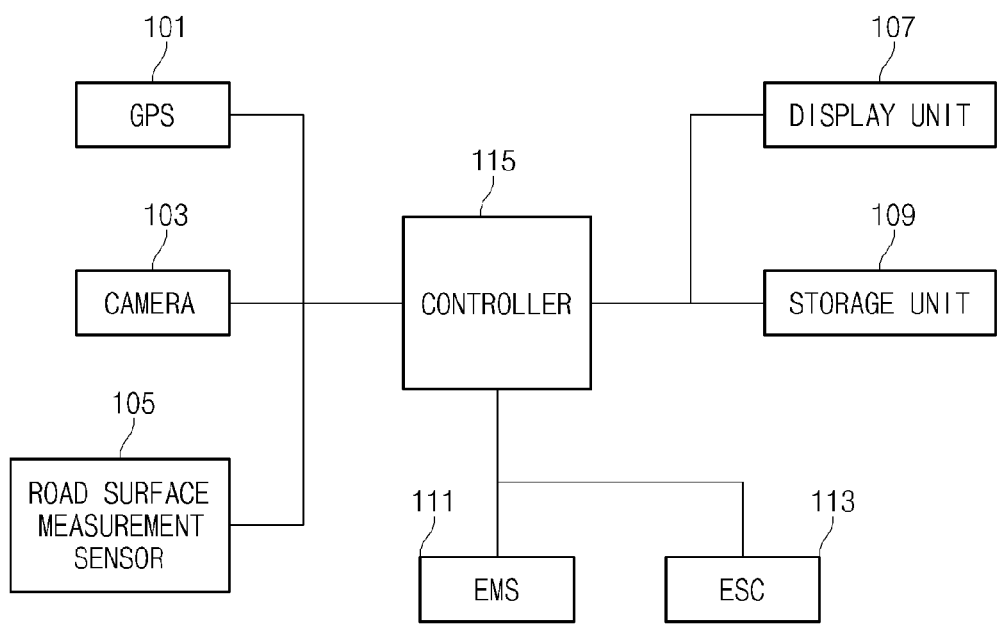
FIG. 1 is a block diagram illustrating a system for detecting road surface conditions according to an exemplary embodiment of the present inventive concept.

Reference will now be made in detail to various embodiments of the present inventive concept(s), examples of which are illustrated in the accompanying drawings and described below. Like reference numerals in the drawings denote like elements. When it is determined that detailed description of a configuration or a function in the related disclosure interrupts understandings of embodiments in description of the embodiments of the inventive concept, the detailed description will be omitted.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example, vehicles powered with both gasoline and electricity.

Figure 2:
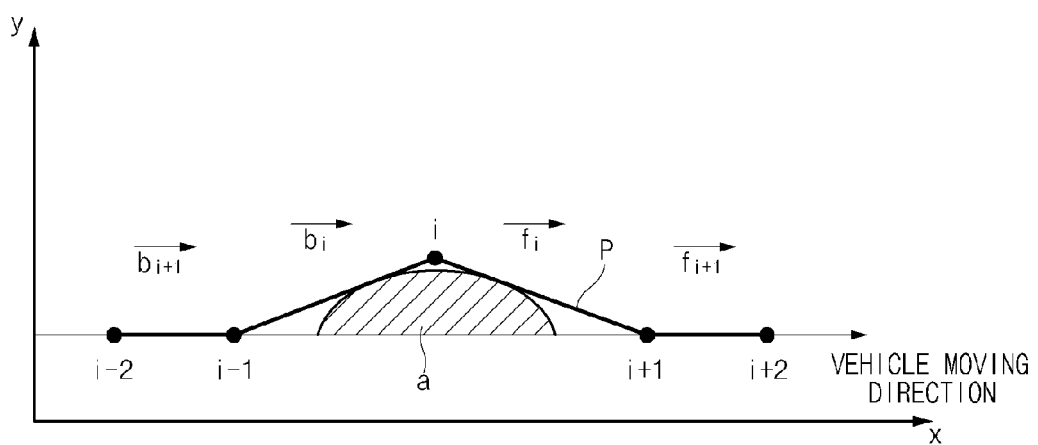
FIG. 2 is a view explaining patterning of a curvature according to a road surface condition according to an exemplary embodiment of the present inventive concept.
Figure 3:
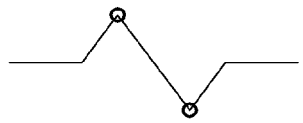
FIG. 3 is a view explaining a pre-stored curvature pattern according to an exemplary embodiment of the present inventive concept.
Figure 3:
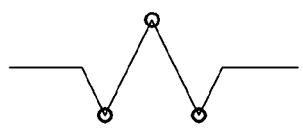
Figure 3:
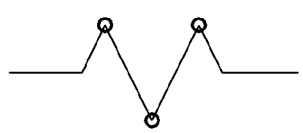
Figure 4:
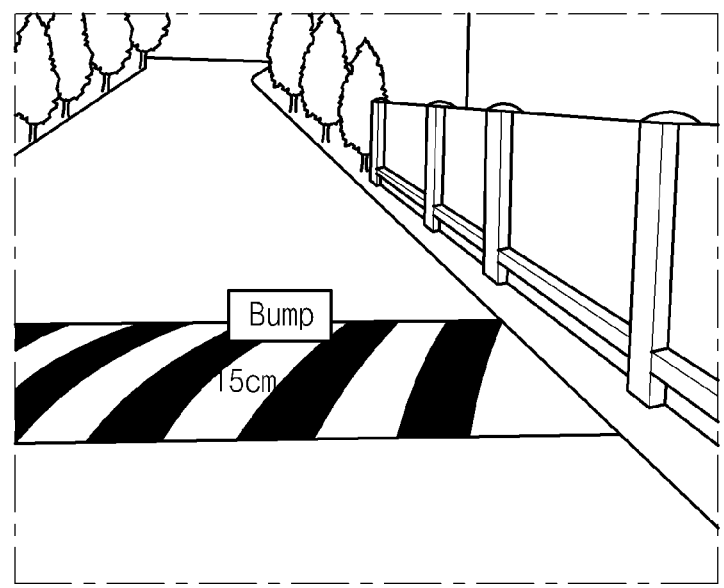
FIG. 4 is a view illustrating status information of a road surface provided to a driver according to an exemplary embodiment of present inventive concept.

FIG. 1 is a block diagram illustrating a system for detecting road surface conditions according to an exemplary embodiment of the present inventive concept. FIG. 2 is a view explaining patterning of a curvature according to a road surface condition according to an exemplary embodiment of the present inventive concept. FIG. 3 is a view explaining a pre-stored curvature pattern according to an exemplary embodiment of the present inventive concept. FIG. 4 is a view illustrating status information of a road surface provided to a user according to an exemplary embodiment of the present inventive concept.

Referring to FIGS. 1 to 4, a system 100 for detecting road surface conditions according to an exemplary embodiment of the present inventive concept, may include a GPS 101, a camera 103, a road surface measurement sensor 105, a display unit 107, a storage unit 109, an engine management system (EMS) 111, an electronic stability control (ESC) 113, and a controller 115. The term "road surface condition" used in describing the present inventive concept means a state, such as a speed bump of a road, dent of a road, and the like.

The GPS 101 may be installed in the inside of a vehicle, and measure an accurate location of the vehicle and convert the measured location into a coordinate value.

The camera 103 may be installed in the front/rear of the vehicle, and acquires image data for a current location of the vehicle.

The road surface measurement sensor 105 may be located in the front of the vehicle, and measure a road surface condition according to a vehicle moving direction. At this time, as the road surface measurement sensor 105, a Laser Rader which is Light Detection and Ranging (LiDAR) may be used, but the road surface measurement sensor 105 is not limited thereto, and various sensors corresponding thereto may be used.

The display unit 107, under control of the controller 115, may output image data for a current location of the vehicle, combine the road surface condition identified in the controller 115 with the output image data, and output a combined result. The road surface condition may be displayed as illustrated in FIG. 4. Referring to FIG. 4, under control of the controller 115, the display unit 107 may output the image data in a vehicle moving direction, combine a height of the speed bump on the road, and the like with the image data, and output the combine result. Therefore, the driver may identify an accurate numerical value according to the road surface condition or the type of the road surface condition to ensure safety of the vehicle and to improve ride comfort of the passenger in traveling.

The storage unit 109 may store image data acquired in the camera 103 according to a location of the vehicle, combine information about the numerical value of the height of the road surface condition and the type of the road surface condition identified in the controller 115 with the image data, and store a combined result. At this time, when the storage unit 109 combines the information of the road surface condition and the image data, and store the combined result, the storage unit 109 may store a coordinate value of the location of the vehicle measured in the GPS 101 together with the image data combined with the information.

The EMS 111 may control an engine operation, and precisely control improvement in engine power, driving performance, an exhaust gas, idle speed, ignition timing, and the like. Further, the EMS 111 may receive signals for battery information, temperature of vehicle engine, and driving performance of the vehicle to operate various circuits and the system, and perform control of the engine and transmission of the vehicle.

The ESC 113 may identify vehicle speed information and braking power information of the vehicle and provide identified information to the controller 115.

The controller 115 may digitalize a measurement signal received from the road surface measurement sensor 105, calculate a curvature pattern for the road surface condition based on the digitalized value, and compares the calculated curvature pattern with a pre-stored curvature pattern to identify the road surface condition.

More specifically, the controller 115 may digitalize the measurement signal received from the road surface measurement sensor 105 located in the front of the vehicle and configured to measure the road surface condition in the vehicle moving direction. The controller 115 may perform a coordinate conversion on the digitalized value. The coordinate conversion may be performed as illustrated in FIG. 2. In FIG. 2, an X-axis indicates the vehicle moving direction, and the reference numeral a denotes an object such as a speed bump formed on a road or stones on the road. The controller 115 may convert the highest location of the object into a reference point i through the coordinate conversion, sequentially convert locations before the reference point i into coordinate values i−1 and i−2, and sequentially convert locations after the reference point i into coordinate values i+1 and i+2.

The controller 115 may extract a vector value for the road surface condition to which the coordinate conversion is completed. As seen from FIG. 2, a vector value between the coordinate values i−2 and i−1 is $\vec{b}_{i+1}$, a vector value between the coordinate values i−1 and i is $\vec{b}_i$, a vector value between the coordinate values i and i+1 is and a vector value between the coordinate values i+1 and i+2 is $\vec{f}_{i+1}$. At this time, the vector value may be extracted through Equation 1.

$$\vec{f}_i = (x_{i+t_f[i]} - x_i, y_{i+t_f[i]} - y_i) = (f_{x_i}, f_{y_i}) \quad \text{[Equation 1]}$$
$$\vec{b}_i = (x_{i+t_b[i]} - x_i, y_{i+t_b[i]} - y_i) = (b_{x_i}, b_{y_i})$$

The controller 115 may calculate a curvature of the road surface condition using the extracted coordinate values and vector values. More specifically, the controller 115 may calculate a Triangle Area Representation (TAR) value using a TAR-based curvature measurement algorithm to extract a triangle point, and normalize the triangle point. The triangle point ($k_i$) may be extracted using Equation 2, and be normalized to an absolute value by substituting $k_i$ derived from Equation 2 into Equation $\{k_i\}_{i-1}^N$, $\max(\{k_i\}_{i-1}^N)$.

$$k_i = \frac{1}{2} \begin{vmatrix} b_{x_i} & b_{y_i} & 1 \\ 0 & 0 & 1 \\ f_{x_i} & f_{y_i} & 1 \end{vmatrix} \quad \text{[Equation 2]}$$

The controller 115 may pattern the road surface condition as a curvature pattern P illustrated in FIG. 2 when the normalized absolute value is larger than a threshold value, for example, 0.3. At this time, the threshold value is arbitrarily set for description, and may be modified and applied for convenience. The controller 115 may compare the curvature pattern P and the curvature pattern information pre-stored in the storage unit 109 to determine whether or not the two patterns match each other. The curvature pattern information pre-stored in the storage unit 109 may be illustrated in FIG. 3. The controller 115 may determine that the curvature pattern P is similar to the curvature pattern information corresponding to (b) as shown in FIG. 3. The controller 115 may continuously and repeatedly accumulate the curvature pattern of the patterned road surface condition for a threshold period of time, for example, 2 seconds, and store an accumulated result in the storage unit 109.

The controller 115 may recognize the road surface condition from the curvature pattern when the accumulated number of times of the curvature pattern is more than a threshold value, and display image data corresponding to the vehicle moving direction and the road surface condition in the display unit 207 as illustrated in FIG. 4. At this time, the threshold value may be th=20/(velocity/20 (kph)), where the "velocity" means an average velocity for 2 seconds. When the traveling velocity of a vehicle is increased, since the number of data measured for 2 seconds is reduced, the controller may set the detection threshold of times inversely proportional to the velocity as described above, give the driver warning for the road surface condition when the curvature patterns above the threshold number of times is detected, and change the threshold value according to the velocity to perform vehicle control. Further, the threshold period of time, the threshold value, and the threshold number of times are arbitrarily set for description, and may be modified and applied.

The controller 115 may store the current location of the vehicle identified through the GPS 101, and the image data and road surface condition displayed in the display unit 107 in the storage unit 109. Hereafter, the controller may display the stored data in the display unit 107 when the vehicle passes the stored location, and provide the driver the road surface condition before the road surface condition is measured.

Figure 5:
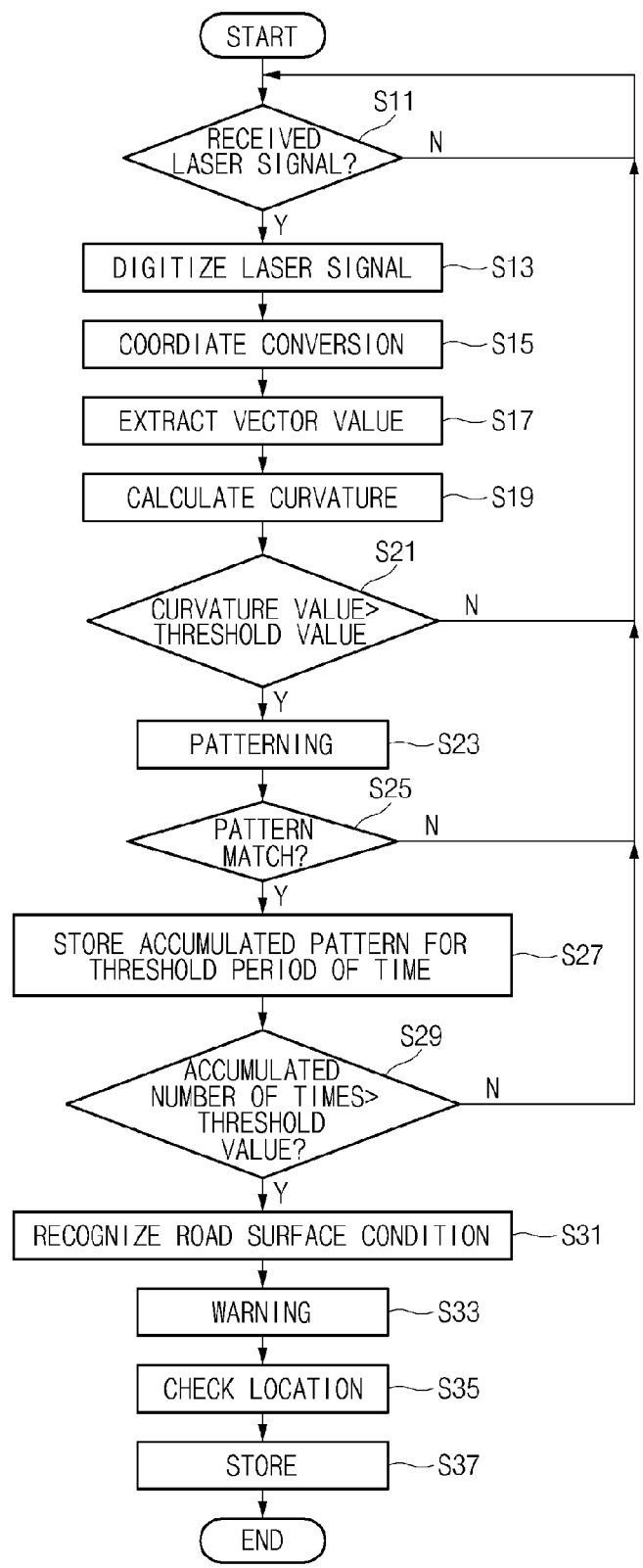
FIG. 5 is a flowchart illustrating a method of detecting road surface conditions according to an exemplary embodiment of the present inventive concept.

FIG. 5 is a flowchart illustrating a method of detecting road surface conditions according to an exemplary embodiment of the inventive concept.

Referring to FIG. 5, in step S11, the controller 115 may receive a measurement signal from the road surface measurement sensor 105. At this time, the road surface measurement sensor 105 may be located in the front of the vehicle, measure the road surface condition in the vehicle moving direction using Laser, and provide the controller 115 with the measurement signal.

In step S13, the controller 115 may digitalize the measurement signal received from the road surface measurement sensor 105, and in step S15, the controller 115 may perform a coordinate conversion on the digitalized value. The coordinate conversion may be performed as illustrated in FIG. 2. In FIG. 2, an X-axis indicates the vehicle moving direction, and the reference numeral a denotes an object such as a speed bump formed on a road or stones on the road. The controller 115 may convert the highest location of the object into a reference point i through the coordinate conversion, sequentially convert locations before the reference point i into coordinate values i−1 and i−2, and sequentially convert locations after the reference point i into coordinate values i+1 and i+2.

In step S17, the controller 115 may extract a vector value for the road surface condition to which the coordinate conversion is completed. As seen from FIG. 2, a vector value between the coordinate values i−2 and i−1 is $\vec{b}_{i+1}$, a vector value between the coordinate values i−1 and i is $\vec{b}_i$, a vector value between the coordinate values i and i+1 is $\vec{f}_i$, and a vector value between the coordinate values i+1 and i+2 is $\vec{f}_{i+1}$. At this time, the vector value may be extracted through Equation 1

In step S19, the controller 115 may calculate a curvature of the road surface condition using the extracted coordinate values and vector values. More specifically, the controller 115 may calculate a Triangle Area Representation (TAR) value using a TAR-based curvature measurement algorithm to extract a triangle point, and normalize the triangle point. The triangle point may be extracted using Equation 2, and be normalized to an absolute value by substituting $k_i$ derived from Equation 2 into Equation $\{k_i\}_{i-1}^N$, $\max(\{k_i\}_{i-1}^N)$.

In step S21, the controller 115 may proceed to step S23, and pattern the road surface condition as the curvature pattern P illustrated in FIG. 2 when the absolute value normalized in step S19 is larger than a threshold value, for example, 0.3. On the other hand, the controller 115 may return to step S11 when the normalized absolute is smaller than the threshold value, for example, 0.3. At this time, the threshold value is arbitrarily set for description and may be modified and applied.

In step S25, the controller 115 may compare the curvature pattern P with the curvature pattern information pre-stored in the storage unit 109 to determine whether or not two patterns match each other. The controller 115 may proceed to step S27 when it is determined that the two patterns match each other, and return to step S11 when it is determined that the two patterns do not match each other. Examples of the curvature pattern information pre-stored in the storage unit 109 is illustrated in FIG. 3. The controller 115 may determine that the curvature pattern P is similar to the curvature pattern information corresponding to (b) as shown in FIG. 3.

In step S27, the controller 115 may continuously and repeatedly accumulate the curvature pattern of the patterned road surface condition through steps S11 to S23 for a threshold period of time, for example, 2 seconds, and may store an accumulated result in the storage unit 109.

In step S29, the controller 115 may proceed to step S31 when the accumulated number of times of the curvature pattern is more than a threshold value, and the controller 115 may return to step S11 when the accumulated number of times of the curvature pattern is less than the threshold value. At this time, the threshold for the accumulated number of times may be th=20/(velocity/20 (kph)), where the velocity means an average velocity for 2 seconds. When the traveling velocity of a vehicle is increased, since the number of data measured for 2 seconds is reduced, the controller may set the detection threshold number of times inversely proportional to the velocity as described above, give the driver warning for the road surface condition when the curvature patterns above the threshold number of times is detected, and change the threshold value according to the velocity to perform vehicle control. Further, the threshold period of time, the threshold value, and the threshold number of times are arbitrarily set for description, and may be modified and applied.

In step S31, the controller 115 may recognize the road surface condition by the curvature pattern, and proceed to step S33 to display the road surface condition in the display unit 107. The road surface condition may be displayed as illustrated in FIG. 4. The controller 115 may combine the road surface condition with the image data acquired from the camera 103 or pre-stored in the storage unit 109, and display a combined result.

In step S35, the controller 115 may identify the current location of the vehicle through the GPS 101, and in step S37, the controller 115 may store the identified location of the vehicle, and the image data and road surface condition displayed in the display unit 107 in the storage unit 109.

As described above, the inventive concept may detect a road surface condition, and provide the driver an accurate numerical value according to the road surface condition to ensure safety of the vehicle and to improve ride comfort of a passenger in traveling.

The system and method for detecting road surface conditions according to an exemplary embodiment of the present inventive concept have been described. The foregoing descriptions of specific exemplary embodiments of the present inventive concept have been presented for purposes of illustration and description. They are not intended to be exhaustive or to limit the inventive concept to the precise forms disclosed, and obviously many modifications and variations are possible in light of the above teachings. The exemplary embodiments were chosen and described in order to explain certain principles of the inventive concept and their practical application, to thereby enable others skilled in the art to make and utilize various exemplary embodiments of the present inventive concept, as well as various alternatives and modifications thereof. It is intended that the scope of the inventive concept be defined by the Claims appended hereto and their equivalents.

What is claimed is:

1. A system for detecting road surface conditions, the system comprising:
   a road surface measurement sensor attached to a vehicle and configured to generate a measurement signal for a road surface condition; and
   a controller configured to digitalize the received measurement signal, convert the digitalized measurement signal into a coordinate value, extract a vector value based on the coordinate value, and calculate a curvature for the road surface condition using the vector value, calculate the curvature pattern for the road surface condition based on the calculated curvature, compare the calculated curvature pattern with the pre-stored curvature pattern to accumulate the number of times for a threshold period of time when the two curvature patterns match each other, and identify the road surface condition when the cumulative number of times is more than a threshold value,
   wherein the threshold value is inversely proportional to a velocity of the vehicle.

2. The system of claim 1, further comprising a display unit configured to combine the identified road surface condition with image data corresponding to a location of the vehicle, and display a result of the combination.

3. The system of claim 2, further comprising a global positioning system (GPS) configured to identify the location of the vehicle.

4. The system of claim 3, wherein the controller is configured to map the road surface condition, the location of the vehicle identified in the GPS, and the image data, and store a result of the mapping.

5. A method for identifying road surface conditions, the method comprising:
   receiving a measurement signal for a road surface condition corresponding to a location of a vehicle from a road surface measurement sensor through a controller;
   digitalizing the received measurement signal and converting the digitalized measurement signal into a coordinate value;
   extracting a vector value based on the coordinate value; and
   calculating a curvature for the road surface condition using the vector value;
   calculating a curvature pattern for the road surface condition based on the digitalized measurement signal;
   comparing the calculated curvature pattern with the pre-stored curvature pattern to accumulate the number of times when the two curvature patterns match each other; and
   identifying the road surface condition when the accumulated number of times is more than a threshold value, wherein the threshold value is inversely proportional to a velocity of the vehicle; and
   displaying the identified road surface condition.

6. The method of claim 5, wherein the displaying of the identified road surface condition includes combining the identified road surface condition with image data corresponding to the location of the vehicle, and displaying a result of the combination.

7. The method of claim 6, further comprising identifying the location of the vehicle in which the road surface condition is displayed, mapping the road surface condition, the image data, and the location of the vehicle, and storing a result of the mapping, after the displaying of the identified road surface condition.

* * * * *